March 8, 1960     A. L. FACCOU     2,927,805
SWIVEL COUPLING WITH SPRING-URGED RING PRESSING THE SEAL
Filed June 21, 1956     4 Sheets-Sheet 1
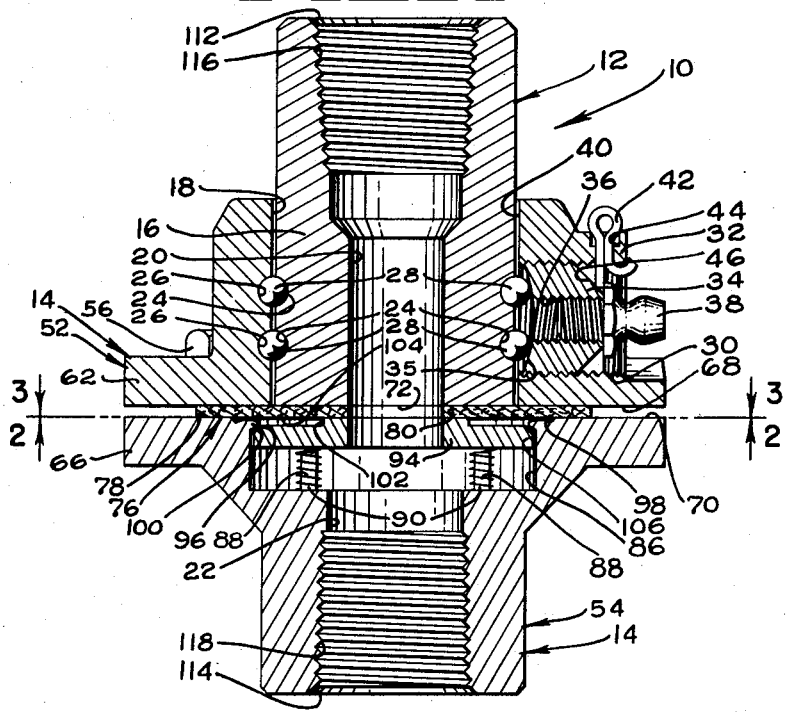
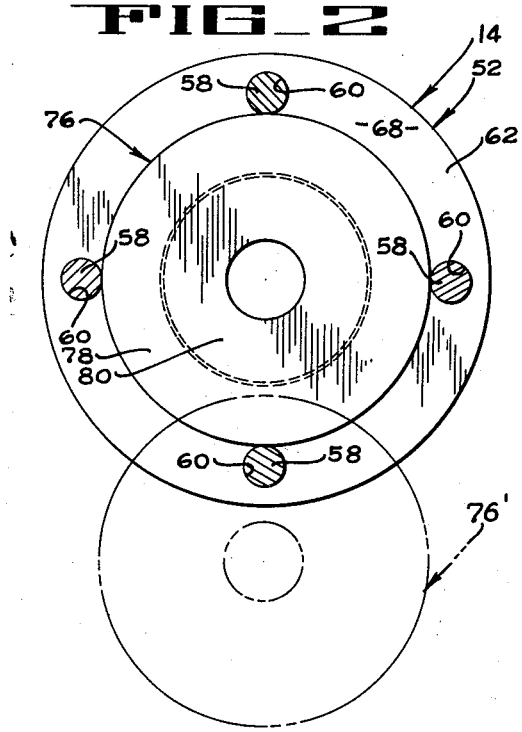
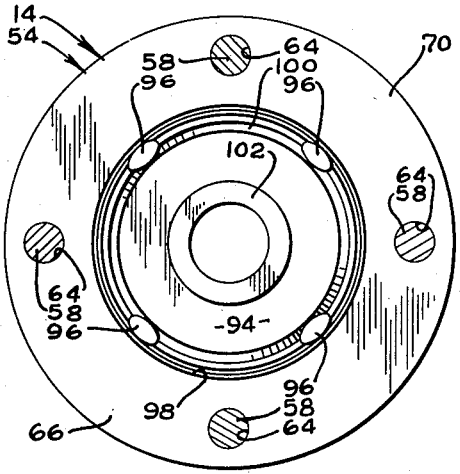
INVENTOR
ARMAND L. FACCOU
BY
ATTORNEY

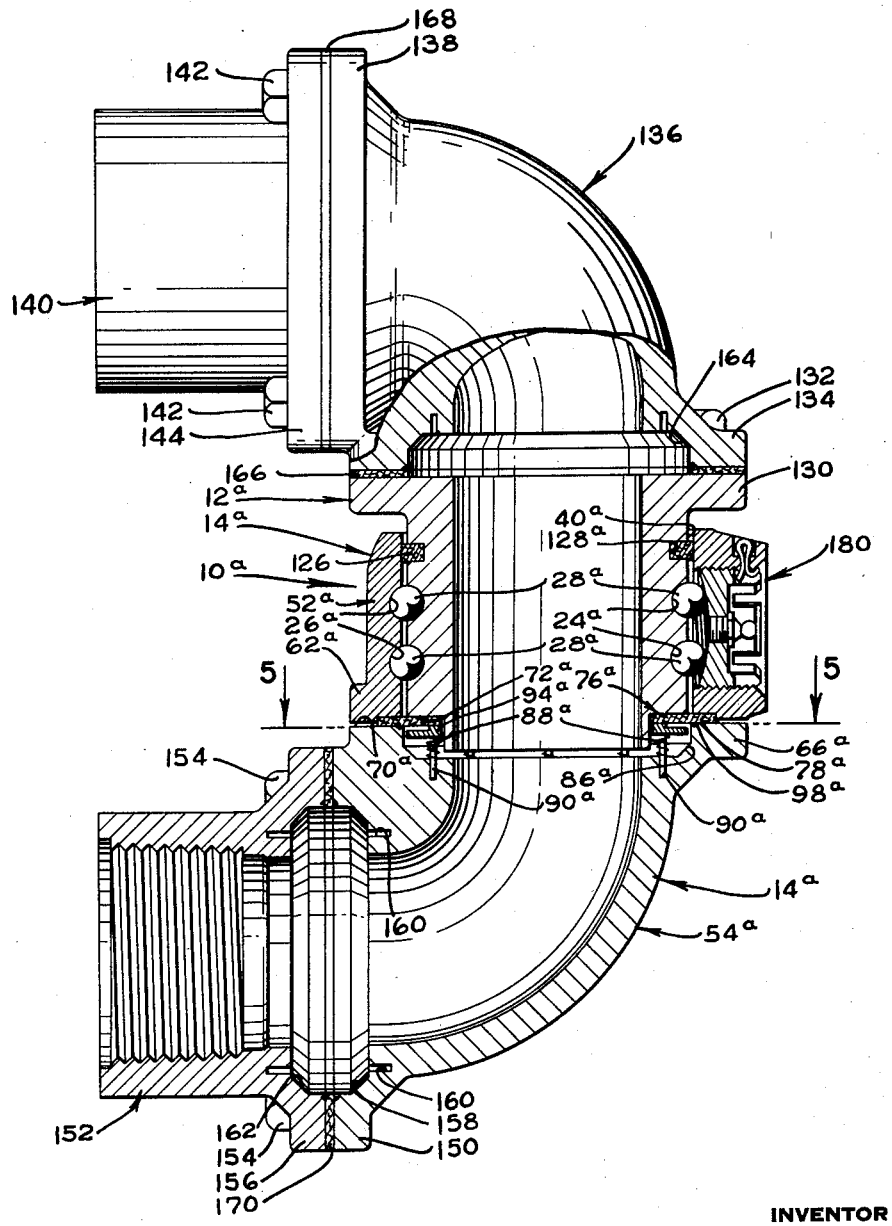

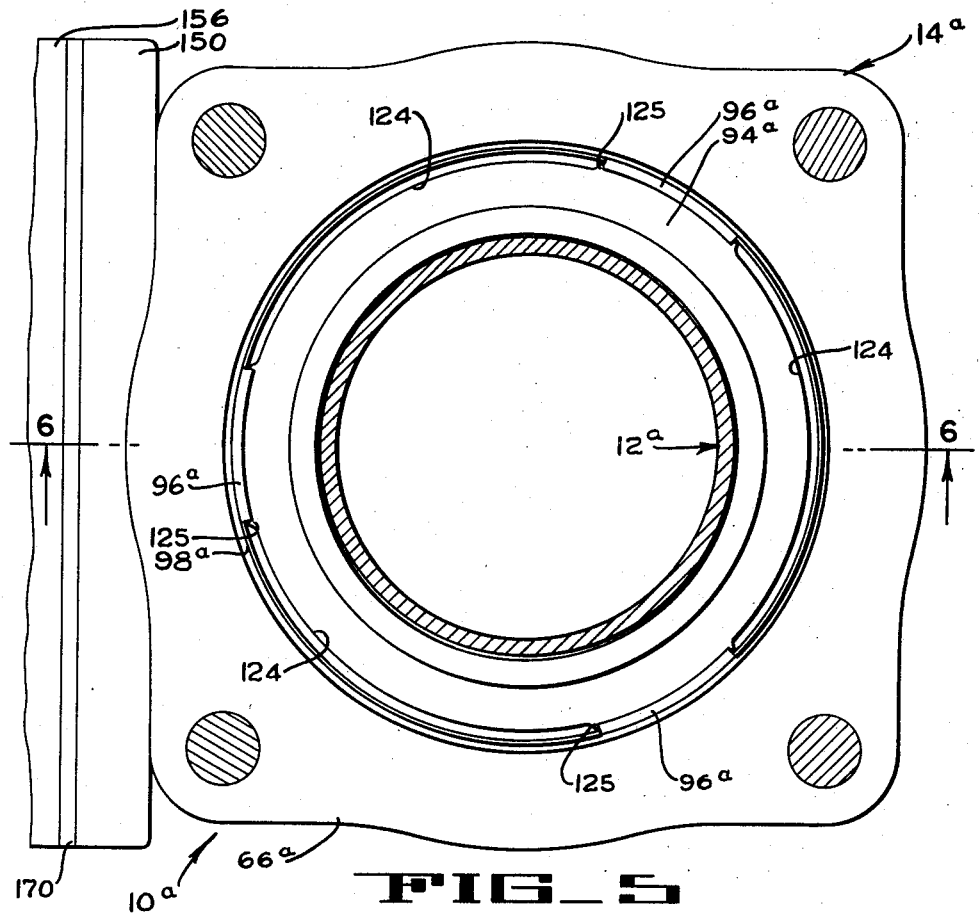
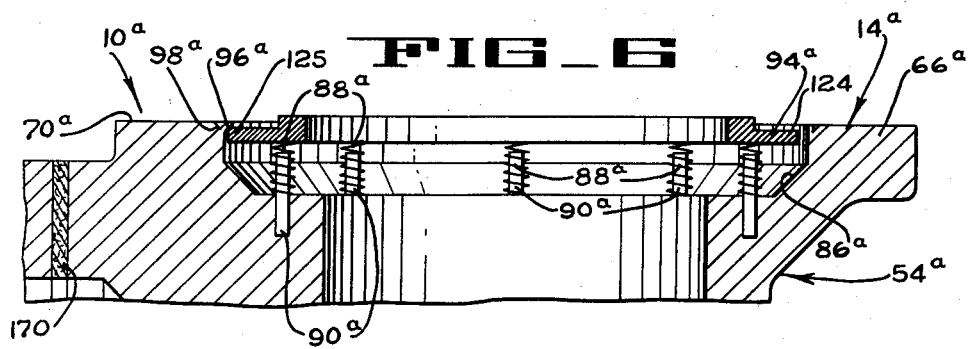
INVENTOR
ARMAND J. FACCOU

March 8, 1960  A. L. FACCOU  2,927,805
SWIVEL COUPLING WITH SPRING-URGED RING PRESSING THE SEAL
Filed June 21, 1956  4 Sheets-Sheet 4
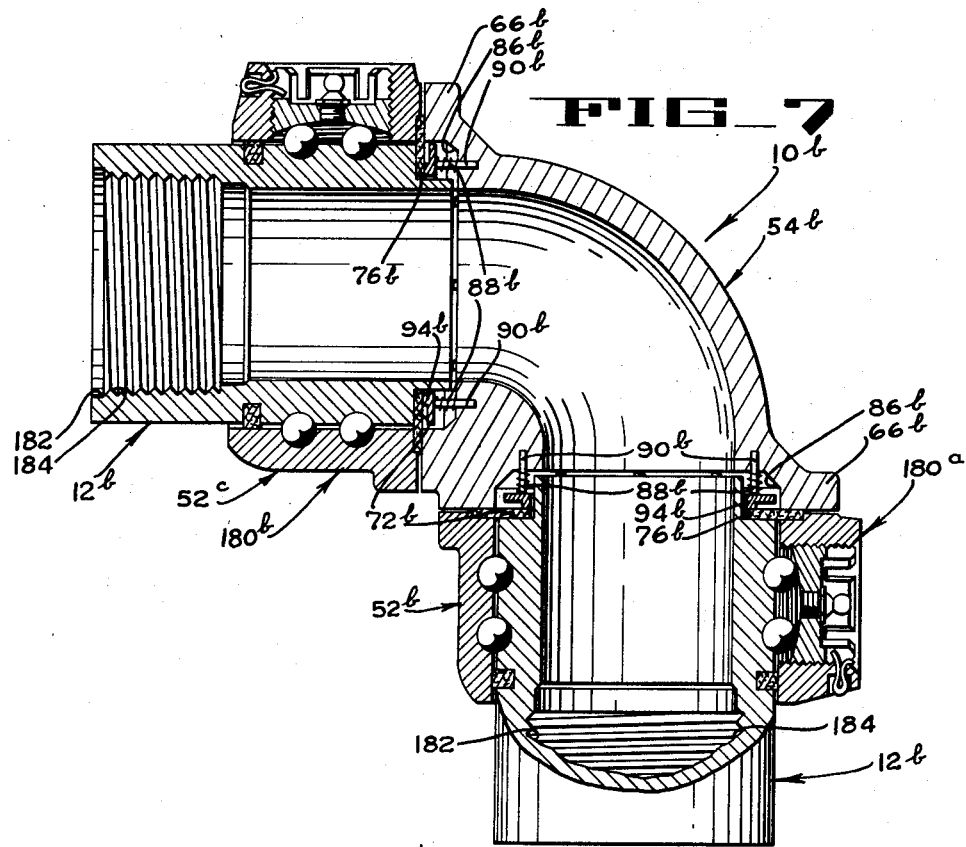
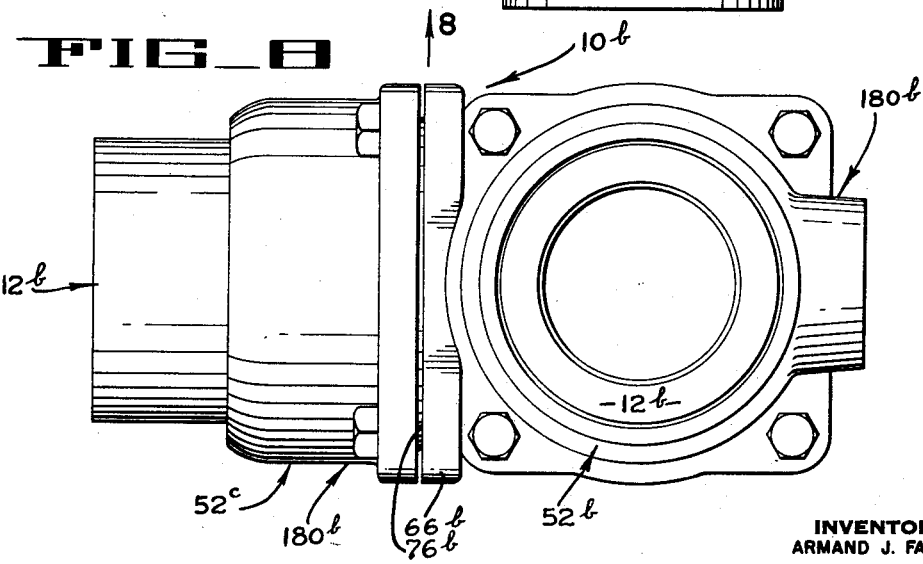
INVENTOR
ARMAND J. FACCOU
BY Hans G. Hoffmeister
ATTORNEY

United States Patent Office 2,927,805
Patented Mar. 8, 1960

2,927,805

SWIVEL COUPLING WITH SPRING-URGED RING PRESSING THE SEAL

Armand L. Faccou, Santa Ana, Calif., assignor to Food Machinery and Chemical Corporation, San Jose, Calif., a corporation of Delaware Application June 21, 1956, Serial No. 592,933

2 Claims. (Cl. 285—95)

This invention relates to pipe joints or couplings and more particularly to a coupling for rotatably interconnecting two sections of a conduit to convey fluid from one section to the other without leakage of the fluid.

An object of the invention is to provide an improved fluid-conducting swivel joint.

Another object is to provide a swivel joint having an improved fluid seal for preventing leakage between the relatively rotatable parts of the joint.

Another object is to provide a swivel joint adapted for installation, removal and replacement of the fluid seal thereof quickly and easily and requiring for such operations only that the parts of the joint engaged by the seal be loosened but not disconnected.

Another object is to provide a swivel joint particularly adapted for, but not necessarily limited to, use under circumstances subjecting the joint to severe temperature changes.

Another object is a provision of a fluid-conducting swivel joint comprising an assembly of separate parts and employing a simple and economical form of sealing element that performs the dual functions of a gasket clamped between parts of the assembly that are fixed relatively to each other and likewise of providing a sliding seal between relatively rotatable parts of the joint.

Another object of the invention is to provide a supply of interchangeable stock parts and sub-assemblies adapted for assembly in a number of ways to produce several different types of swivel joints.

Other objects and advantages of the invention will become apparent from the following description and the drawings, in which:

Fig. 1 is a section taken axially through a swivel joint embodying the present invention.

Fig. 2 is a section taken along lines 2—2 of Fig. 1.

Fig. 3 is a section taken along lines 3—3 of Fig. 1.

Fig. 4 is a section, partially in elevation, taken axially of a modified form of swivel joint of the invention.

Fig. 5 is an enlarged fragmentary section taken along lines 5—5 of Fig. 4.

Fig. 6 is a fragmentary section taken along lines 6—6 of Fig. 5.

Fig. 7 is a section, partially in elevation, taken axially of a further modified form of swivel joint of the invention.

Fig. 8 is a view taken in the direction of the arrow 8 in Fig. 7.

Referring first to Figs. 1-3, the swivel joint 10 there illustrated comprises cooperating inner and outer tubular joint members 12 and 14, respectively. A cylindrical end portion 16 of the inner joint member 12 is rotatably disposed within a socket 18 in the outer joint member 14 in coaxial relation therewith, placing the bores 20 and 22 of the members 12 and 14, respectively, in communication with each other. Ball races 24, preferably two in number, are formed in the outer cylindrical wall of the inner joint member 12, and cooperating races 26 are provided in registry therewith in the inner cylindrical surface of the outer joint member 14, to accommodate anti-friction balls 28. The balls 28 fit within the registering races 24 and 26 so that they serve not only to rotatably support the joint members 12 and 14 in a manner to retain the same accurately in coaxial alignment and permit relative rotation therebetween with a minimum of friction, but they also retain the joint members 12 and 14 against axial displacement with respect to each other. After the inner joint member 12 has been seated within the outer member 14, the balls 28 are inserted through an access opening 30 that extends through a boss 32 on one side of the outer joint member 14, and then a plug 34 having a concave inner end 35 is screwed into the opening 30 to prevent escape of the balls. A threaded axial hole 36 through the plug 34 receives a conventional grease fitting 38 adapted to be engaged by a grease gun (not shown) to supply lubricant to the balls 28, the races 24 and 26, and the clearance space 40 between the relatively rotatable joint members 12 and 14. A cotter pin 42 inserted through a hole 44 in the boss 32, seats within a notch 46 in the outer end of the plug 34 to securely lock the plug in position with its concave inner end accurately in alignment with the outer circumferential surfaces of the ball races 26 to complement the same and thereby to provide for free rolling of the balls 28 across the access opening 30 upon occurrence of relative rotary motion between the pin and socket members 12 and 14, respectively.

The outer joint member 14 comprises a socket section 52 and a coupler section 54 releasably but rigidly secured to each other by a plurality of cap screws 56, the shanks 58 of which (Figs. 2 and 3) extend through clearance holes 60 (Fig. 2) in a radial flange 62 of the section 52 and are screwed into threaded holes 64 (Fig. 3) in a similar flange 66 of the section 54. The contiguous faces 68 and 70 of the flanges 62 and 66, respectively, are both flat and lie in parallel planes that extend transversely of the joint 10. The inner end portion 16 of the inner joint member 12 terminates in a radial, axially facing end face or shoulder 72, and the parts are so proportioned and assembled that the end face 72 is disposed in planar alignment with the face 68 of the flange 62 as clearly shown in Fig. 1.

A seal 76 of annular form is gripped tightly between the flanges 62 and 66. This seal 76 is formed of at least slightly flexible sheet material that is impervious to the fluids intended to be handled by the swivel joint 10. Conventional sheet packing of the type commonly employed for gasket material has proven entirely satisfactory for this purpose. Only the outer peripheral region 78 of the annular seal 76 is engaged between the flanges 62 and 66 and the inner portion 80 of the annular seal 76 extends across the clearance space 40 between the joint members 12 and 14 and across the end face 72 of the inner joint member 12 to establish a sliding fluid seal therewith.

An annular recess 86 extends axially into the section 54 of the outer joint member 14 from the face 70 of its flange 66. A plurality of compression springs 88 are mounted on pins 90 within the recess 86 at equal angular distances from each other about the longitudinal axis of the joint 10. The springs 88 are loosely mounted upon the pins 90 so that the springs can continuously exert force axially of the joint 10 against a backing ring 94 which is floatingly mounted within the recess 86. Consequently the ring 94 serves to distribute the force of the several springs 88 throughout an annular area of the inner peripheral region 80 of the seal ring 76, causing the seal ring to press against the seal surface provided by the end face 72 of the inner joint member 12 with sufficient pressure to preclude leakage between the annular seal 76 and the seal surface 72.

Whereas the backing ring 94 is free to float within the recess 86, it is retained against accidental displacement from the recess 86 when the sections 52 and 54 are separated, by a plurality of tongues 96 projecting radially inward from the circumferential wall of the recess 86 adjacent the mouth of the same and over the backing ring 94. These tongues 96 are conveniently formed by upsetting, or riveting a short section of the circumferential wall of the recess 86 to project a small amount of metal into the recess 86 after the springs 88 and backing ring 94 have been installed. Such method of forming the tongues 96 is facilitated by providing an annular groove 98 in the face 70 of the flange 66 concentric with and adjacent the mouth of the recess 86. A suitable tool such as a blunt cold chisel or drift can be inserted into the groove 98 in an oblique position sloping radially inward, and by then tapping the outer end of the tool, a short length of the inner edge of the groove can be bent inward to form one of the tongues 96. Preferably the peripheral corner 100 of the backing ring 94 engaged by the tongues is chamfered as shown in Fig. 1.

The backing ring 94 is formed with an upstanding annular shoulder or bead 102 on its outer surface, i.e., the surface thereof opposite that which is engaged by the springs 88. Thus, an annular space 104 (Fig. 1) is left open between the backing ring 94 and the seal ring 76. The outside diameter of the backing ring 94 is slightly less than the inside diameter of the recess 86, thus leaving a clearance 106 through which fluid from the bore 22 of the joint member 14 can penetrate to the annular space 104 in back of the seal ring 76. Consequently, full pressure of the fluid within the joint 10 is applied to the back of the seal ring 76, increasing the pressure with which the seal ring 76 engages the seal surface 72 proportionally with the line pressure within the conduit of which the joint 10 is a part.

As clearly shown in Fig. 2 the outside diameter of the annular seal 76 corresponds to the diameter of a circle inscribed tangent to the innermost sides of the shanks 58 of the several cap screws 56. It is apparent, therefore, that this arrangement facilitates insertion of a seal ring 76 into operative position within the joint 10, since the shanks 58 serve to center the seal ring 76 in coaxial relationship with the other members of the joint 10. Furthermore, removal of a seal ring 76 from the joint 10 and insertion of a seal ring into the joint are facilitated by the flat configuration of the opposed faces 68 and 70 of the flanges 62 and 66. By loosening all of the cap screws 56 the flanges 62 and 66 are permitted to separate far enough to release their grip upon the seal ring 76; and then by the simple expedient of removing but one of the cap screws 56 the seal ring can be withdrawn from between the flanges as indicated in broken lines at 76' in Fig. 2. This permits removal and inspection of a seal ring without requiring complete disconnection of the sections 52 and 54 of the joint member 14 and without disturbing the journal mounting of the inner joint member 12 within the socket section 52 of the joint member 14. Obviously, reinsertion of the seal 76 after such inspection, or insertion of a new seal 76 to replace one that has been unduly worn may be effected with equal facility.

Being characterized by such ease of removal and reinsertion or replacement of the sealing member of the joint, particularly adapts the joint 10 for use in handling fluids containing abrasives or chemicals apt to have deleterious effect upon the material of which the seal ring 76 is composed because it permits replacement of a worn or otherwise damaged seal ring 76 with minimum interruption of the operation of the joint 10. Another advantage inherent in a joint constructed in accordance with the above description results from the fact that the engaging, relatively movable surfaces of the seal lie in a plane perpendicular to the axis of the joint. Because of this arrangement, these surfaces react equally to temperature changes, and therefore are not disturbed as a consequence of expansion or contraction of the joint when the same is subjected to severe thermal fluctuation. Consequently, the joint of the present invention is particularly adapted for use in handling high temperature fluids.

The joint members 12 and 14 are provided with counterbores 112 and 114, respectively (Fig. 1), which are threaded as indicated at 116 and 118, to permit the members 12 and 14 to be engaged upon pipes (not shown) so as to rotatably couple the pipes and to convey fluid from one to the other.

In describing the modification of the swivel joint illustrated in Figs. 4-6, parts thereof that correspond or are similar in function to parts of the above-described joint 10, will be identified by the same reference numerals, each with the suffix "a" added, and only those elements that do not have corresponding parts in the joint 10 will be identified by newly assigned reference numerals.

In the joint 10a of Figs. 4-6 a sliding fluid-tight seal is established between the relatively rotatable joint members 12a and 14a by a seal ring 76a similar in both structure and function to the seal ring 76 first described. The outer peripheral region 78a of the seal ring 76a is gripped by and serves as a gasket between opposed flanges 62a and 66a integral with and extending radially from adjacent ends of the joint members 12a and 14a, respectively. As in the first described form of the invention, the seal ring 76a is continually pressed against the seal surface 72a of the inner joint member 12a by a backing ring 94a that floats within an annular recess 86a which extends axially into the flange 66a of the coupler section 54a of the outer joint member 14a. Springs 88a guided on pins 90a and under compression between the backing ring 94a and the bottom of the recess 86a are employed to urge the backing ring 94a axially of the recess 86a to exert pressure against the seal ring 76a and thus ensure that it establishes sealing engagement with the seal surface 72a. The backing ring 94a is retained within the recess 86a in a manner permitting free floating of the ring 94a relative to the joint member 14a, by a plurality of tongues 96a, each of which is formed by deflecting inward a short section of the inner edge of a groove 98a in the face 70a of the flange 66a. As best shown in Fig. 5, the peripheral edge of the backing ring 94a is relieved at spaced intervals, thus providing sectors 124 of reduced radius. Hence, the ring 94a is releasably retained in operative position by a bayonet joint arrangement, so that when the ring 94a is turned to bring its sectors 124 into alignment with the tongues 96a, the backing ring 94a can be removed from the coupler section 54a. Under normal circumstances of use, however, the backing ring 94a remains with its sectors 125 of greater radius (Figs. 5 and 6) in alignment with the tongues 96a so that the sections 52a and 54a of the joint member 14a can be separated from each other without permitting displacement of the backing ring 94a or of the springs 88a from the recess 86a of the section 54a.

The inner and outer joint members 12a and 14a are rotatably interconnected and are restrained against relative axial movement by anti-friction balls 28a (Fig. 4) engaged within ball races 24a and 26a in the inner and outer joint members 12a and 14a, respectively. The joint 10a is additionally provided with a packing ring 126 seated within an annular groove 128 in the outer cylindrical surface of the inner joint member 12a and making sliding, sealing engagement with the inner surface of the outer joint member 14a to retain lubricant between the relatively rotatable joint members 12a and 14a and to exclude from the clearance space 40a of he joint such substances as dust, dirt and water, that might interfere with smooth operation of the swivel joint.

The inner joint member 12a further differs from the joint member 12 in that instead of being provided with an interiorly threaded counterbore the joint member 12a has at its outer end a radially extending flange 130 having a series of holes (not shown) tapped to receive cap screws 132 (Fig. 4), thus adapting the inner joint member 12a to be rigidly secured to a corresponding flange 134 of a conduit section. In the form of joint illustrated in Fig. 4 the conduit section to which the joint member 12a is attached is a 90 degree L 136.

The present invention contemplates the provision of a wide assortment of conduit members each of which is provided with a flange such as the flange 134 of the L 136 so that any one of a considerable variety of conduit sections can be attached to the outer end flange 130 of the inner joint member 12a, thus making possible the assembly of several different styles of swivel joint from stock parts.

The opposite end of the L 136 from the flange 134 is provided with another attaching flange 138 having therein a series of tapped holes (not shown) spaced similarly to the clearance holes in the flange 134. Another fitting such as an interiorly threaded coupling member 140 is attached to the flange 138 by a series of cap screws 142 each of which extends loosely through a clearance hole (not shown) in an end flange 144 on the coupling member 140. The clearance holes in the flange 144 of the coupling member 140 correspond to and are arranged similarly to the clearance holes in the flange 134 of the L 136. This makes it possible to omit the L 136 and to mount the coupling member 140 directly upon the end flange 130 of the inner coupling member 12a. Such an arrangement would effect mounting of the swivel joint 10a for relative rotation of its members 12a and 14a about an axis coinciding with that of a pipe to whose end the coupling member 12a would be directly attached, whereas when the parts are arranged as illustrated in Fig. 4 and the coupling member 140 is secured to a length of pipe (not shown) the axis of the length of pipe will be disposed at right angles to the axis of rotation of joint members 12a and 14a.

The outer joint member 14a as illustrated in Fig. 4, differs from the outer joint member 14 of the first described form of the swivel joint of the invention in that the coupling section 54a of the joint member 14a is an L fitting instead of a straight nipple as in the joint 10. As hereinabove mentioned, the flange 66a is provided at one end of the L fitting 54a. A similar flange 150 is provided at the other end of the L fitting 54a, to which a coupling member 152 can be attached by a plurality of cap screws 154 extending through clearance holes (not shown) in an end flange 156 of the coupling member 152 and threaded into similarly spaced holes in the flange 150 of the L fitting 54a.

It will be observed that the flanges 62a, 130, 134, 138, 144, 66a, 150 and 156 are similar in all respects except that the holes in some of these flanges are clearance holes through which the shanks of the cap screws 132, 142 and 154 loosely extend whereas the holes in the others of these flanges are smaller in diameter and are threaded for the reception of the threaded portions of the shanks of the cap screws. The question of which of these holes will be threaded and which will be enlarged to provide clearance holes will not be determined until the precise manner of assembly of a certain group of stock parts is decided upon to produce a given style of swivel joint. Therefore it is contemplated that the stock parts made available for selection and assembly shall have all their attaching flanges drilled to form holes of the proper size for tapping so that a cap screw can be threadedly engaged therein, and that only those flanges through which cap screws are to extend loosely in the particular arrangement of stock parts decided upon, shall be drilled to the larger size to provide the desired clearance holes.

Another feature of the present invention that contributes toward the practicability of providing an assortment of stock parts from which selection may be made depending upon the style of joint desired, is the provision of a recess corresponding to the recess 86a in the face of each flanged end of the several different styles of stock parts. For example, the L fitting 54a is provided with the recess 86a in one end thereof as hereinabove described. Another recess 158 of the same size and shape is provided in the flange 150 at its opposite end and a suitable arrangement of sockets 160 are drilled in the bottom of the recess 158 for the reception of pins corresponding to the pins 90a. This permits either end of the L fitting 54a to be employed for attachment to the socket section 52a of the outer joint member 14a depending upon the desired joint design. For a similar purpose, a recess 162 is provided in the attaching flange 156 of the coupling member 152, and another recess (not shown) in the flange 144 of the coupling member 140. The L fitting 136 is identical with the L fitting 54a, since its attaching flanges 134 are each provided with a recess 164 of the same shape and size as the recess 86a. This arrangement permits either the flange 130 of the inner coupling member 12a or the flange 66a of the socket section 52a to be connected to either end of either of the L fittings 136 or 54a or to either of the flanges 144 or 156 of the coupling members 140 or 152, respectively. In any event the annular recess of whichever flange is attached to the flange 62a of the socket portion 52a should have pins 90a, springs 88a and a backing ring 94a mounted therein before connection to the socket portion 52a. It will be understood that suitable gaskets such as those indicated at 166, 168 and 170 will be provided between each two adjacent flanges wherever a sliding fluid seal is not employed.

It is intended that among the stock parts made available for assembly according to any desired pattern there will be included a supply of sub-assemblies 180, each consisting of an inner joint member 12a and an outer socket portion 52a rotatably interconnected by ball bearings 28a as hereinabove described. One or more such swiveled sub-assemblies 180 can then be assembled into each design of swivel joint. For example, Figs. 7 and 8 illustrate a further modified form of the swivel joint of the invention incorporating two such swiveled sub-assemblies indicated at 180a and 180b, respectively. These two sub-assemblies are mounted at opposite ends of the L fitting 54b which, therefore, corresponds to the coupling section 54a of the outer coupling member 14a of the joint 10a, but instead of serving as the coupling member for a single socket section as in the joint 10a, the L fitting 54b as employed in the joint of Figs. 7 and 8 provides the coupling section for each of two socket sections 52b and 52c whose axes are disposed at right angles to each other. Such being the case, the annular recess 86b at each end of the L fitting 54b is provided with pins 90b, springs 88b and a backing ring 94b and a seal ring 76b is associated with each end of the L fitting 54b. Each of these seal rings 76b is clamped throughout its outer peripheral portion against the flange 66b at the associated end of the L fitting 54b whereas the inner peripheral portion of each seal ring 76b slidably engages an axially facing shoulder 72b on the inner or pin member 12b of the associated swiveled sub-assembly 180a or 180b, as the case might be. Each of the pin members 12b in the swivel joint 10b of Figs. 7 and 8 is provided with a counterbore 182 having internal threads 184 adapted to receive the threaded end of a length of pipe (not shown). Thus it may be seen that the swivel joint 10b of Figs. 7 and 8 serves to couple two lengths of pipe disposed at right angles to each other in such a manner that each length of pipe is rotatable not only about its own axis but likewise about an axis at right angles thereto.

While three forms of swivel joint embodying the present invention have been shown and described it will be understood that the joint is capable of further modification and variation while still employing the principles of the invention. It is to be understood, therefore, that the The invention having thus been described, that which is believed to be new and for which protection by Letters Patent is desired, is:

1. A fluid conducting swivel joint comprising a housing including two sections having coupling flanges and means for releasably interconnecting the flanges in opposing relation with each other, an inner tubular member mounted within one of the housing sections, bearing means rotatably supporting the tubular member within said one of the housing sections and restraining the tubular member against axial movement relative thereto, an abutment surface on the inner end of said tubular member substantially coplanar with the end surface of the flange on said one of the housing sections, the other of the housing sections having a recess therein facing said abutment surface on the inner tubular member, a seal-actuating ring in the recess, an annular shoulder adjacent the inner edge of the ring and projecting axially from the surface thereof that faces the inner tubular member, spring means in the recess behind said seal-actuating ring and forcing the ring toward said abutment surface on the inner tubular member when the housing sections are in assembled relation, means integral with said other housing section overlying the ring to retain the same in the recess when the housing sections are disconnected from each other, and an annular flat sealing member of sheet packing gasket material mounted between the housing sections, the outer periphery of the sealing member being clamped between said flanges in sealing relation therewith, the inner portion of the sealing member being forced against said abutment surface of the tubular member by said annular shoulder on the ring and said spring means in sliding sealing engagement with the tubular member.

2. A fluid conducting swivel joint comprising a housing including two sections having coupling flanges and means for rigidly interconnecting said flanges, an inner tubular member mounted within one of said housing sections, bearing means rotatably supporting said tubular member within said one of the housing sections and restraining the tubular member against axial movement relative thereto, an abutment surface on the inner end of said tubular member substantially coplanar with the end surface of the flange on said one of the housing sections, the other of the housing sections having a recess therein facing the abutment surface on the inner tubular member, a seal-actuating ring in the recess, an annular shoulder adjacent the inner edge of the ring and projecting axially from the surface thereof that faces the inner tubular member, spring means in the recess behind the seal-actuating ring and forcing the ring toward the abutment surface on the inner tubular member when the housing sections are in assembled relation, means on said other housing section and overlying the ring to retain the same in the recess when the housing sections are disconnected from each other, and an annular flat sealing member of sheet packing gasket material mounted between the housing sections with its outer periphery clamped between said flanges and with its inner portion forced against said abutment surface of the tubular member by said annular shoulder on the ring to effect sliding sealing engagement with said abutment surface in a restricted area of contact therewith.

References Cited in the file of this patent

UNITED STATES PATENTS

| | | |
|---|---|---|
| 879,880 | Landau | Feb. 25, 1908 |
| 1,012,398 | McCombie | Dec. 19, 1911 |
| 1,166,579 | Clay | Jan. 4, 1916 |
| 1,446,057 | Moyen | Feb. 20, 1923 |
| 1,535,219 | Fulton | Apr. 28, 1925 |
| 1,617,587 | Frumveller | Feb. 15, 1927 |
| 1,669,949 | Reynolds | May 15, 1928 |
| 1,729,483 | Koch | Sept. 24, 1929 |
| 1,790,398 | Worthington | Jan. 27, 1931 |
| 2,071,750 | Kusebauch | Feb. 23, 1937 |
| 2,247,242 | Kreidel | June 24, 1941 |
| 2,312,341 | King | Mar. 2, 1943 |
| 2,328,898 | Goff | Sept. 7, 1943 |
| 2,332,787 | Fleming | Oct. 26, 1943 |
| 2,509,091 | Faccou | May 23, 1950 |
| 2,653,837 | Voytech | Sept. 29, 1953 |

FOREIGN PATENTS

| | | |
|---|---|---|
| 496,089 | Belgium | June 30, 1950 |
| 884,909 | France | May 10, 1943 |